United States Patent
Nusser et al.

[11] Patent Number: 6,158,771
[45] Date of Patent: Dec. 12, 2000

[54] HONEYCOMB CRASH PAD

[75] Inventors: Lori A. Nusser, Pleasanton, Calif.; G. Douglass Dixon, Chandler, Ariz.; H. Robert Hull, San Leandro, Calif.

[73] Assignee: Hexcel Corporation, Pleasanton, Calif.

[21] Appl. No.: 09/178,255

[22] Filed: Oct. 23, 1998

[51] Int. Cl.[7] ................................................ B60R 21/045
[52] U.S. Cl. .......................................... 280/752; 296/189
[58] Field of Search ................................... 280/751, 752; 296/153, 214, 189; 188/377, 371

[56] References Cited

U.S. PATENT DOCUMENTS

| | | | |
|---|---|---|---|
| 3,224,924 | 12/1965 | Von Ardenne et al. | |
| 3,687,223 | 8/1972 | Streck | 181/33 |
| 3,700,067 | 10/1972 | Dobbs et al. | 181/33 |
| 3,834,482 | 9/1974 | Wada et al. | 180/90 |
| 3,989,275 | 11/1976 | Finch et al. | 280/751 |
| 4,045,267 | 8/1977 | Davis et al. | 156/197 |
| 4,091,160 | 5/1978 | Koss | 428/245 |
| 4,093,482 | 6/1978 | Ogata et al. | 156/210 |
| 4,111,081 | 9/1978 | Hilliard et al. | 181/290 |
| 4,249,974 | 2/1981 | Wilson | 156/85 |
| 4,269,882 | 5/1981 | Carrillo et al. | 428/116 |
| 4,298,090 | 11/1981 | Chapman | 181/286 |
| 4,384,634 | 5/1983 | Shuttleworth et al. | 181/213 |
| 4,479,992 | 10/1984 | Häesker et al. | 428/116 |
| 4,783,114 | 11/1988 | Welch | 296/153 |
| 5,102,163 | 4/1992 | Ishikawa | 280/751 |
| 5,255,483 | 10/1993 | Agrawal et al. | 52/397 |
| 5,264,270 | 11/1993 | Agrawal et al. | 428/192 |
| 5,306,066 | 4/1994 | Saathoff | 296/146.6 |
| 5,445,861 | 8/1995 | Newton et al. | 428/116 |
| 5,579,699 | 12/1996 | Dannawi et al. | 105/416 |
| 5,649,721 | 7/1997 | Stafford et al. | 280/751 |
| 5,670,000 | 9/1997 | Colson et al. | 156/197 |
| 5,823,611 | 10/1998 | Daniel et al. | 296/214 |
| 5,836,547 | 11/1998 | Koch et al. | 244/122 R |

FOREIGN PATENT DOCUMENTS

WO 97/10098  3/1997  WIPO .

*Primary Examiner*—Paul N. Dickson
*Attorney, Agent, or Firm*—W. Mark Bielawski; David J. Oldenkamp

[57] ABSTRACT

A crash pad for use in vehicle interiors. The crash pad includes an energy-absorbing honeycomb which has a cover plate attached thereon to prevent noise from being generated due to contact between the crash pad and vehicle interior surface during normal vehicle operation. The cover plate is attached on one side to the honeycomb with the other side being molded to match the shape of the interior surface of the vehicle. The cover plate includes positioning devices which locate and hold the crash pad during interior panel fabrication. The cover plate protects the honeycomb and the technician during handling and installation. The cover plate also helps to retain the shape of the honeycomb and provides a suitable surface for labels that may contain product identification and other information needed during use of the pads in mass production of vehicles.

17 Claims, 2 Drawing Sheets

HONEYCOMB CRASH PAD

BACKGROUND OF THE INVENTION

1. Field of the Invention

The present invention relates generally to crash pads which are placed at various locations within a vehicle to reduce injuries caused when occupants hit interior surfaces of the vehicle during a crash. More particularly, the present invention relates to the use of interior crash pads which utilize a honeycomb structure as the principal energy absorbing element.

2. Description of Related Art

There has been and continues to be major effort to develop and design vehicle interiors which protect occupants as much as possible during the extreme forces experienced during crashes. One approach has involved the placement of crash or crush pads at various locations within the vehicle interior. The crash pads are designed to absorb the energy of impact as the occupant contacts the vehicle interior during a crash.

Initial crash pads were made from elastomeric materials, such as rubber, or from foamed plastics. Although these materials provide some protection, they are not particularly efficient and they may release stored energy during impact. This release of stored energy, commonly referred to as "rebound," can actually exacerbate injuries suffered during a crash. In addition, foam products suitable for use as crash pads tend to be bulky. As a result, they are not well-suited for use in vehicle interiors where space is limited. In order to reduce the bulk of foamed plastics, they must be made to high densities. However, such high density foams tend to be difficult to manufacture.

Honeycomb structures have been used in crash pads as an alternative to elastomers and foams. Honeycomb structures are advantageous because they are capable of efficiently absorbing large amounts of energy. One example of a honeycomb-based crash pad is disclosed in U.S. Pat. No. 5,649,721. The crash pad is designed for aircraft interiors and utilizes an aluminum honeycomb as the basic energy absorbing material.

There are a number of different problems which must be taken into account when developing a crash pad for use in vehicle interiors. The pad must provide adequate energy absorption without being so bulky that it intrudes into the vehicle interior. The pad should be light weight. The pad must be capable of being mounted in close proximity to the interior surface of the vehicle shell without causing squeaking, buzzing or rattling. The pad should also be amenable to installation in a wide variety of locations within the vehicle interior. In addition, the pad should be capable of accurate and efficient installation into the vehicle interior in mass production situations such as those present in an automotive assembly line.

SUMMARY OF THE INVENTION

In accordance with the present invention, a crash pad is provided which is suitable for use in a wide variety of locations within the interior of vehicles. The crash pad is capable of absorbing large amounts of impact energy and includes features which reduce squeaks, rattles and buzz. The crash pad is especially well-suited for use in headliners to protect passengers from head injuries.

The crash pad of the present invention includes a honeycomb which is made from energy-absorbing material. The honeycomb includes a first face which is located nearest to the interior surface of the vehicle when the honeycomb crash pad is located adjacent to the interior surface. The honeycomb further includes a second face which is located furthest from the interior surface of the vehicle when the honeycomb crash pad is located adjacent thereto. The honeycomb has a side surface which extends between the first and second faces around the perimeters thereof.

As a feature of the present invention, a cover plate is provided which has an outside surface, an inside surface, and a perimeter wherein the outside surface is shaped to match the interior surface of the vehicle. The inside surface of the cover plate is attached to the first face of the honeycomb. The cover plate can be molded or press fit onto the honeycomb. Alternatively, an adhesive layer which is located between the cover plate and the honeycomb first surface can be used to provide attachment of the cover plate to the honeycomb.

The cover plate provides positioning of the crash pad on the interior surface of the vehicle in a manner which eliminates or substantially reduces the amount of squeaking, rattling and buzzing which may result due to contact between the crash pad and the interior surface of the vehicle. As another feature of the present invention, the honeycomb material used in the crash pad is aluminum and the cover plate is made from a plastic material. This combination of energy-absorbing material and cover plate material is especially well-suited for absorbing impact energy between passengers and the vehicle interior surface, while at the same time minimizing noise generated by contact between the crash pad and vehicle interior during normal vehicle operation.

As a further feature of the present invention, the cover plate may include a lip around its perimeter which extends only partially over the side surface of the honeycomb. In this configuration, the cover plate forms a cap which covers the honeycomb edges to prevent noise generated by contact between the edges and the vehicle interior surface. Sharp protrusions, commonly referred to as "dog ears," may occur at the honeycomb edge. These sharp protrusions can generate a substantial amount of noise when they rub against or otherwise contact the vehicle interior surface during normal operation of the vehicle. As a feature of the present invention, the dog ears are folded over to remove this possible source of noise.

In addition to the basic honeycomb crash pad, the present invention also includes panels for use in the interior of a vehicle wherein the panel is located adjacent to an interior surface of the vehicle. The panel includes a liner which is attached to the honeycomb crash pad on the surface opposite the cover plate. Panels where the liner is a headliner are preferred. The present invention also covers vehicles which include at least one interior surface on which a panel in accordance with the present invention is mounted.

As a further feature of the present invention, the cover plate includes one or more positioning elements which are located on the outside surface of the cover plate. The positioning elements are useful during fabrication of headliner panels wherein the honeycomb is held in place by tooling during application of the headliner to the honeycomb surface. The positioning elements may also be used to mate with corresponding positioning elements on the vehicle in order to allow accurate and reproducible placement of the crash pad in mass-produced vehicles, such as automobiles.

As another feature of the present invention, protuberances are provided on the outside surface of the cover plate. These protuberances may be in the form of ridges or small bumps which help to position the crash pad in close proximity adjacent to the vehicle interior surface. Protuberances on the cover plate surface are used when the interior surface of the vehicle is built to manufacturing tolerances which may create cavities or contact points between the interior surface and the crash pad. The protuberances provide for localized contact between the cover plate and the interior surface of the vehicle to hold the crash pad in place.

The cover plate provides a number of advantages when used in combination with the energy absorbing honeycomb. For example, it is difficult to maintain a given crash pad shape when using thin and/or flexible honeycombs. The cover plate provides sufficient rigidity to the combined structure to insure that the desired crash pad shape is retained. In addition, the edges of honeycombs tend to be ragged and not well-defined. The cover plate provides a definite perimeter which is useful in many situations where the size and shape of the crash pad must meet certain tolerances. Further, the cover plate acts as a protective cap which protects the honeycomb portion of the crash pad during transport, handling and installation of the crash pad. The cover plate also protects installation technicians, and other individuals who handle the crash pads from cuts and scratches which may be caused by exposed honeycomb edges. Also, the relatively smooth surface of the cover plate provides a suitable location for labels or other identifying indicia which are required as part of fabrication and installation processes.

The above discussed and many other features and attendant advantages of the present invention will become better understood by reference to the following detailed description when taken in conjunction with the accompanying drawings.

DETAILED DESCRIPTION OF THE INVENTION

Figure 1:
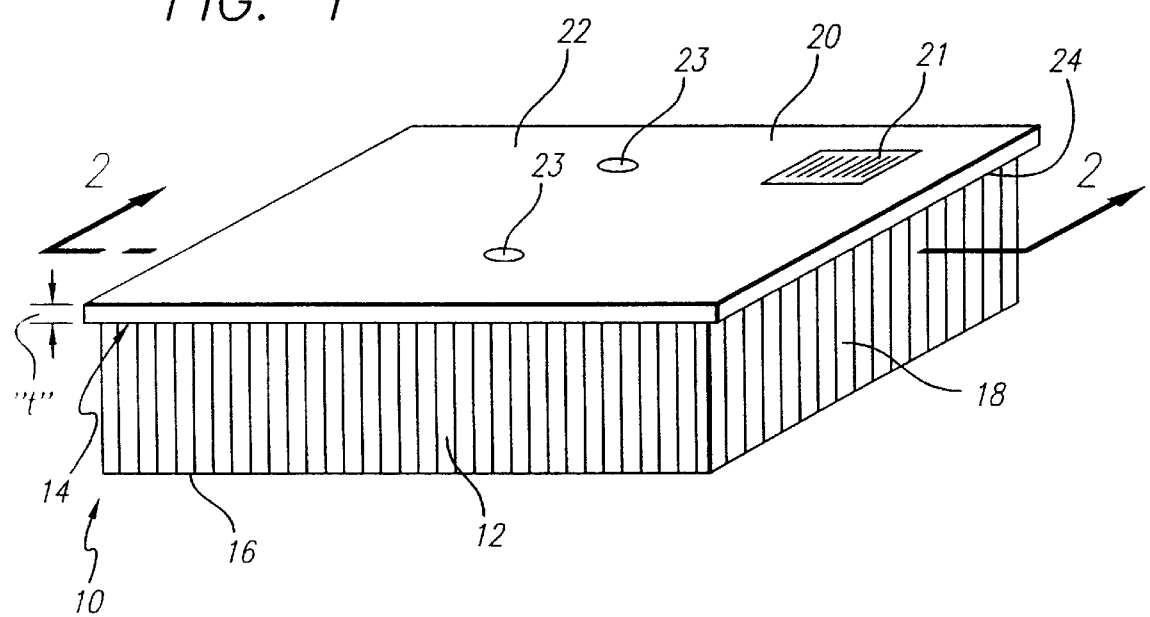
FIG. 1 is a perspective view of a preferred exemplary crash pad in accordance with the present invention.

A preferred exemplary honeycomb crash pad in accordance with the present invention is shown generally at 10 in FIG. 1. The honeycomb crash pad 10 is intended to be used in the interior of a vehicle where it is located adjacent to an interior surface of the vehicle. Although the honeycomb crash pad may be located anywhere within the vehicle interior, it is preferred that one or more crash pads be located at various locations in the vehicle headliner.

The crash pad 10 includes a honeycomb 12 which is made from energy-absorbing material. Although any number of energy-absorbing materials may be used to make the honeycomb 12, it is preferred that thin aluminum sheets be used. Preferably, the aluminum sheet will be on the order of 0.0007 inch to 0.005 inch (0.001 cm to 0.013 cm) thick. Headliner crash pads generally have thicknesses on the order of 0.6 cm to 1.3 cm. Knee bolsters are generally much thicker with thicknesses being on the order of 15 cm to 26 cm. Preferred aluminum alloys include those alloys which are flexible and capable of absorbing energy when in the form of a honeycomb. Honeycombs made from thin aluminum sheets have been found to be especially effective in absorbing impact energy. For example, see U.S. Pat. No. 5,649,721 which discloses the use of aluminum honeycomb to absorb passenger impact on aircraft bulkheads. The honeycomb may include cells having a wide variety of shapes provided that the desired impact absorption is achieved. Conventional hexagonal honeycomb cells are preferred.

Figure 2:
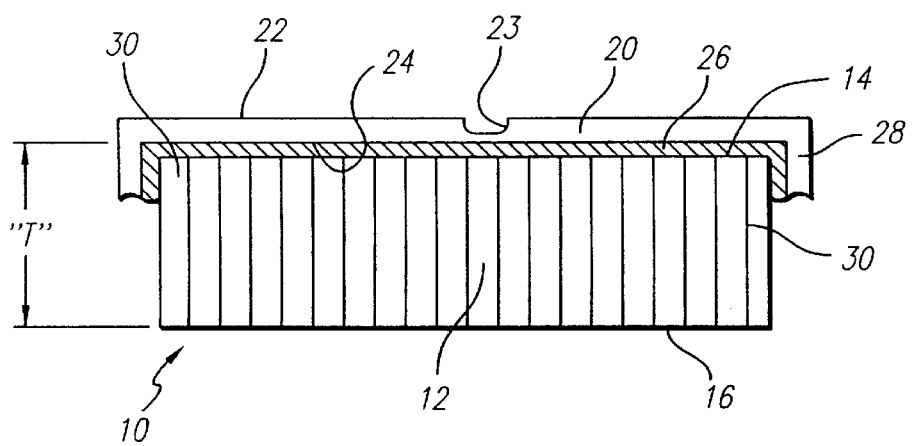
FIG. 2 is a sectional view of FIG. 1 taken in the 2—2 plane.

Referring to both FIGS. 1 and 2, the honeycomb 12 includes a first face 14 which is located nearest to the interior surface of the vehicle, and a second face 16 which is located furthest from the interior surface of the vehicle. The honeycomb 12 further includes a side surface 18 which extends between the first and second faces 14 and 16 along their perimeters. The side face 18 shown in FIGS. 1 and 2 includes four sides due to the rectangular shape of the honeycomb. The side surface 18 will include at least three surfaces for honeycombs in a triangular shape and may include up to an infinite number of surfaces as the honeycomb shape approaches a cylinder. The preferred exemplary honeycomb shown in FIG. 2 is depicted as a rectangle for simplicity. It will be understood by those of ordinary skill in the art that any number of honeycomb shapes may be utilized.

The crash pad 10 includes as an essential feature a cover plate 20. The cover plate 20 includes an outside surface 22 and an inside surface 24. The outside surface 22 is shaped to match the interior surface of the vehicle. The outside surface 22 shown in FIGS. 1 and 2 is relatively flat and is intended for mounting adjacent to relatively flat interior surfaces. This is for demonstrative purposes only, with it being understood that the outside surface 22 may be arched in shape or include multiple curves in order to match the shape of a given interior surface of a vehicle. The inside surface of the cover plate 24 is shaped to match the first face 14 of the honeycomb. This allows the cover plate 20 to be adhesively bonded to the honeycomb 12 regardless of the shape of outside surface 22. As best shown in FIG. 2, the cover plate 20 is bonded to honeycomb 12 by an adhesive layer 26 which is located between the cover plate inside surface 24 and honeycomb first face 14. It is preferred that the cover plate 20 include a lip 28 which extends at least partially down the side 18 of the honeycomb. The lip 28 makes the cover plate 20 a cap which protects the dog ears which are located along the honeycomb edges at 30.

The cover plate 20 may be made from a variety of elastomeric and plastic materials. Although elastomers such as rubber may be utilized, it is preferred that the cover plate 20 be made from a thermoplastic material, such as polypropylene or other suitable thermoplastic elastomer. The thermoplastic material may be formed into the cover plate by molding suitable thermoplastic sheets between mold surfaces which match the interior surface of the vehicle on one side and the honeycomb surface on the other. Any number of various molding procedures may be utilized, including the use of vacuum bag and injection molding techniques.

The honeycomb and cover plate will vary in thickness depending upon the particular application for the crash pad. As mentioned previously, the crash pads are preferred for use as part of a headliner in automotive vehicles. When used in headliners, the thickness of the honeycomb 12, as represented by "T" in FIG. 2, should be on the order of ¼ inch to ¾ inch (0.6 cm to 2 cm). This range of thicknesses provides an optimum combination of energy absorption without making the headliner so thick that it encroaches into the vehicle interior. Cover plate thicknesses, as represented by "t" in FIG. 1, should be on the order of 0.01 to 0.040 inch (0.02 cm to 0.1 cm). The surface area defined by perimeters of the cover plate and honeycomb can vary from a few square inches up to a few square feet. It is preferred that the surface area or footprint covered by the crash pad be on the order of 3 to 150 square inches. Crash pads having much larger footprints are also possible. Such crash pads can have footprints ranging up to a few square feet. It is further preferred that a plurality of crash pads be incorporated into the headliner at various strategic locations within the vehicle interior where there is a high likelihood of passenger impact during a crash.

A label 21 is preferably attached to the cover plate 20 to allow product identification and/or other indicia to be placed on the crash pad. Instead of a label, the indicia may be directly printed or molded onto the cover plate.

Figure 3:
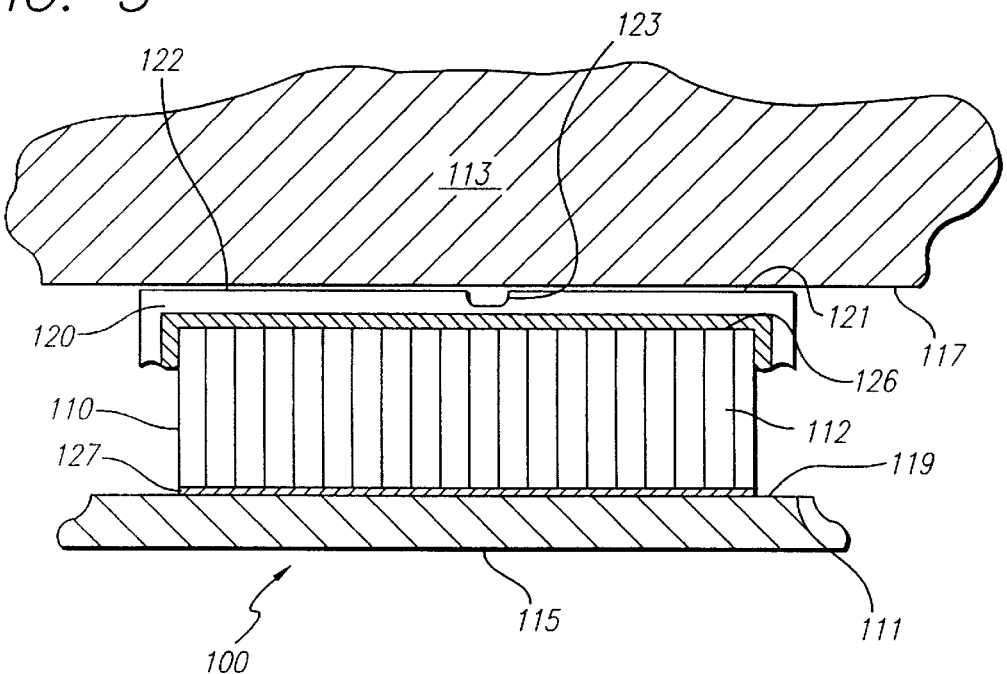
FIG. 3 is a side sectional view of a panel in accordance with the present invention wherein the crash pad is mounted on one side to a headliner and located on the other side adjacent to the interior surface of a vehicle.

A preferred exemplary panel in accordance with the present invention is shown in FIG. 3 in the form of headliner 100. The headliner 100 is made up of a crash pad 110 which is bonded to liner 111. The headliner 100 is shown in position adjacent to the roof 113 of a vehicle. The liner 111 includes an inward surface 115 which is located furthest away from the interior surface 117 of the vehicle and closest to the passenger. The liner 111 further includes an outward surface 119 which is bonded to the crash pad 110 and located closest to the interior surface 117 of the vehicle. The liner 111 is bonded to the crash pad 110 utilizing an adhesive as shown at 127. The adhesive can be any adhesive suitable for bonding metals, such as aluminum, to materials typically used in headliners. Hot melt adhesives are preferred.

The crash pad 110 which is bonded to the liner 111 is the same as crash pad 10 shown in FIGS. 1 and 2. The crash pad 110 includes a honeycomb 112 and a cover plate 120. The cover plate 120 is bonded to the honeycomb 112 utilizing an adhesive 126. The outside surface 122 of cover plate 120 is molded or otherwise shaped to match the surface 117 of the roof 113. These matching surfaces are shown in FIG. 3 as being relatively straight. However, the present invention contemplates fitting crash pads to a wide variety of interior surfaces 117 which may include one or more curves or other complex shapes. In each instance, the outer surface 122 of cover plate 120 is molded using a tool which matches the shape of the interior surface 117 where the crash pad is to be located. It is preferred that the cover plate 120 does not contact surface 117 and that a gap 121 be maintained between surface 122 and surface 117. Preferably, the gap will have thickness on the order of a few millimeters.

As shown in FIGS. 1 and 2, locating indentations 23 are provided in the cover plate 20. The locating indentations 23 are used to help position and hold the crash pad 10 during bonding of headliners thereto. This is especially advantageous in mass production settings where multiple crash pads are being bonded to a large number of headliners. The locating indentations 23 may be used to locate the crash pads on a jig which is then used to hold the crash pads as they are bonded to the headliner. Although the locating indentations are round, as shown in the preferred embodiments, it will be understood by those skilled in the art that any suitable shapes and combinations of positioning indentations may be utilized provided that they ensure accurate relative placement of the crash pad as it is mounted on the fabrication fixture. If desired, the pins may be molded or otherwise formed on the cover plate surface with locating indentations being provided in the headliner production jig. Also, as is well known, locating pins and locating indentations may be formed on both the cover plate and fabrication jig to provide a further indexing function to ensure proper orientation of the crash pad during headliner fabrication. Placing the locating indentations on the crash pads is preferred.

Figure 4:
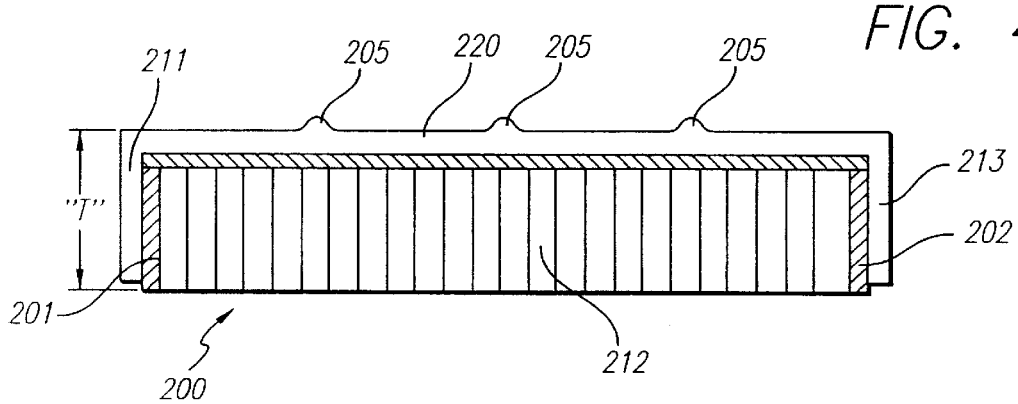
FIG. 4 is a side view of a preferred exemplary crash pad in accordance with the present invention which includes protuberances on the cover plate and wherein the "dog ears" which are located at the cut edges of the honeycomb have been removed.

Another exemplary embodiment of a crash pad in accordance with the present invention is shown generally at 200 in FIG. 4. This crash pad is similar to the crash pad 10, except that the dog ears on the perimeter of honeycomb 212 have been folded inwards to form compressed sections 201 and 202. Dog ears located on the honeycomb are a potential source of vibration, rattle and buzz which can be eliminated by folding the dog ears inward as indicated at 201 and 202.

Referring again to FIG. 4, the crush pad 200 includes a cover plate 220 which covers the body of the honeycomb 212. The cover plate 220 may also extend over the crushed portions 201 and 202 as shown at 211 and 213. The lip may extend up to 100 percent of the thickness (T), to completely cover the side of the honeycomb, if desired.

In many situations during mass production, the manufacturing tolerances for various surfaces in the vehicle interior do not match the tolerances to which the cover plate can be molded. Accordingly, there are instances in which the interior surface (117 in FIG. 3) will vary in dimensions such that it is difficult to easily position and install the headliner. In these instances, it is preferred to provide snug fitting of the crash pad against the interior surface by locating numerous deformable protuberances on the cover plate surface. Exemplary protuberances are shown at 205 in FIG. 4. The protuberances are deformable spikes, standoffs, whiskers or ridges which can be located over the entire cover plate or at selected locations. Alternatively, felt, rubber or other cushioning material may be bonded or otherwise incorporated onto the cover plate to enhance positioning and installation of the headliner. The use of such additional cushioning materials also provide supplemental noise reduction.

Figure 5:
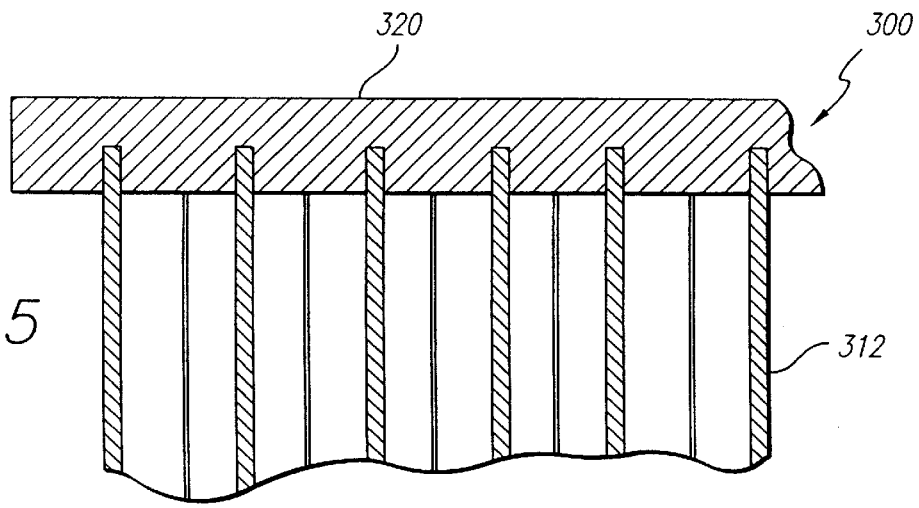
FIG. 5 is a side sectional view of portion of an alternate embodiment of a preferred exemplary crash pad where the cover plate has been attached to the honeycomb by molding, press fitting, vacuum forming or co-forming.

It is also contemplated within the present invention that the cover plate may be attached to the honeycomb by press fitting, vacuum forming, co-forming or otherwise molding the cover plate on the honeycomb. A portion of a crash pad 300 is shown in FIG. 5 where the cover plate 320 has been molded directly onto the honeycomb 312. As can be seen from FIG. 5, the lower portion of the cover plate 320 extends partially into each of the honeycomb cells. If desired, the cover plate may be pre-molded into the shape shown in FIG. 5 and press-fit onto the honeycomb in a subsequent operation. Both molded and press-fit configurations produce a crash pad in which a separate adhesive is not required to attach the cover plate to the honeycomb. The dimples on the lower portion of the cover plate which extend down into the honeycomb cells are sufficient to keep the cover plate securely attached to the honeycomb. If desired, a combination of press-fitting and adhesives may be used to provide an extremely strong bond between the honeycomb and cover plate. When curved crash pads are made, it is preferred that the cover plate be molded and adhered to the curved honeycomb surface in a single step. Prior to molding, the cover plate may include a hot melt adhesive layer which bonds the cover plate to the honeycomb when the cover plate is molded thereon. Alternatively, the cover plate may become sufficiently adherent during the molding process such that an additional adhesive is not required.

The above described embodiments provide for an especially effective crash pad which can be mounted adjacent to and in close proximity to the interior surfaces of a vehicle without generating annoying noise in the form of squeaks, rattles or buzzes. The present invention is well-suited for mass production wherein large numbers of crash pads must be quickly, safely and accurately installed into vehicles either by themselves or in combination with panels, such as headliners.

Having thus described exemplary embodiments of the present invention, it should be noted by those skilled in the art that the within disclosures are exemplary only and that various other alternatives, adaptations and modifications may be made within the scope of the present invention. For example, if desired, the entire honeycomb can be encapsulated with a cover plate in those situations. Accordingly, the present invention is not limited to the above preferred embodiments, but is only limited by the following claims.

What is claimed is:

1. A honeycomb crash pad adapted for use in the interior of a vehicle wherein said crash pad is located adjacent to an interior surface of said vehicle, said honeycomb crash pad comprising:
   a honeycomb made from energy absorbing material, said honeycomb comprising:
      a first face which is located nearest to the interior surface of said vehicle when said honeycomb crash pad is located adjacent to said interior surface, said first face having a perimeter;
      a second face which is located furthest from said interior surface when said honeycomb crash pad is located adjacent to said surface, said second face having a perimeter; and
      a side surface which extends between said first and second faces at the perimeter of said first and second faces;
   a cover plate having an outside surface, an inside surface and a perimeter wherein said outside surface is shaped to match said interior surface of said vehicle and said inside surface is shaped to match the first face of said honeycomb, said inside surface being attached to said honeycomb first face; and
   one or more positioning indentations located on the outside surface of said cover plate.

2. A honeycomb crash pad according to claim 1 wherein said energy absorbing material is aluminum.

3. A honeycomb crash pad according to claim 1 wherein said cover plate comprises a lip around the perimeter of said cover plate, said lip extending over the side surface of said honeycomb.

4. A honeycomb crash pad according to claim 1 wherein said cover plate consists essentially of a plastic material.

5. A panel for use in the interior of a vehicle wherein said panel is located adjacent to an interior surface of said vehicle, said panel comprising:
   a liner comprising an inward surface which is located furthest away from the interior surface of said vehicle, an outward surface which is located closest to the interior surface of said vehicle and a perimeter;
   at least one honeycomb crash pad mounted on the outward surface of said liner, said honeycomb crash pad comprising:
      a honeycomb made from energy absorbing material, said honeycomb comprising:
         a first face which is located nearest to said interior surface of the vehicle when said honeycomb crash pad is located adjacent to said interior surface, said first face having a perimeter;
         a second face which is located furthest from said interior surface when said honeycomb crash pad is located adjacent to said interior surface, said second face having a perimeter; and
         a side surface which extends between said first and second faces at the perimeter of said first and second faces;
      a cover plate having an outside surface, an inside surface and a perimeter wherein said outside surface is shaped to match said interior surface of said vehicle and said inside surface is shaped to match the first face of said honeycomb, said inside surface being attached to said honeycomb first face; and
      one or more positioning indentations located on the outside surface of said cover plate.

6. A panel according to claim 5 wherein said energy absorbing material is aluminum.

7. A panel according to claim 5 wherein said cover plate comprises a lip around the perimeter of said cover plate, said lip extending over the side surface of said honeycomb.

8. A panel according to claim 5 wherein said cover plate consists essentially of a plastic material.

9. A panel according to claim 5 wherein said panel is a headliner.

10. A vehicle comprising:

an interior surface comprising one or more positioning points; and a panel which is located adjacent to said interior surface, said panel comprising:

a liner comprising an inward surface which is located furthest away from the interior surface of said vehicle, an outward surface which is located closest to the interior surface of said vehicle and a perimeter;

at least one honeycomb crash pad mounted on the outward surface of said liner, said honeycomb crash pad comprising:

a honeycomb made from energy absorbing material, said honeycomb comprising:

a first face which is located nearest to said interior surface of the vehicle when said honeycomb crash pad is located adjacent to said interior surface, said first face having a perimeter;

a second face which is located furthest from said interior surface when said honeycomb crash pad is located adjacent to said interior surface, said second face having a perimeter;

a side surface which extends between said first and second faces at the perimeter of said first and second faces; and a cover plate having an outside surface, an inside surface and a perimeter wherein said outside surface is shaped to match said interior surface of said vehicle and said inside surface is shaped to match the first face of said honeycomb, said inside surface being attached to said honeycomb first face; and one or more positioning indentations located on the outside surface of said cover plate wherein said positioning indentations engage said positioning points to provide positioning of said panel relative to said interior surface.

11. A vehicle according to claim 10 wherein said energy absorbing material is aluminum.

12. A vehicle according to claim 10 wherein said cover plate comprises a lip around the perimeter of said cover plate, said lip extending over the side surface of said honeycomb.

13. A vehicle according to claim 10 wherein said cover plate consists essentially of a plastic material.

14. A vehicle according to claim 10 wherein said panel is a headliner.

15. A honeycomb crash pad according to claim 1 which further comprises protuberances located on the outside surface of said cover plate, said protuberances comprising an end surface for contacting the interior surface of said vehicle.

16. A panel according to claim 5 which further comprises protuberances located on the outside surface of said cover plate, said protuberances comprising an end surface for contacting the interior surface of said vehicle.

17. A vehicle according to claim 10 which further comprises protuberances located on the outside surface of said cover plate, said protuberances comprising an end surface for contacting the interior surface of said vehicle.

* * * * *